United States Patent
Schultz

[15] 3,660,237
[45] May 2, 1972

[54] PROCESS FOR OBTAINING KALLEKREIN FROM PANCREAS OR SUBMANDIBULARIS GLANDS OF PIGS

[72] Inventor: Fritz Schultz, Wuppertal-Sonnborn, Germany

[73] Assignee: Farbenfabriken Bayer Aktiengesellschaft, Leverkusen, Germany

[22] Filed: May 19, 1970

[21] Appl. No.: 38,906

[52] U.S. Cl. ..........................................195/66 R
[51] Int. Cl. ............................................C07g 7/026
[58] Field of Search ......................................195/66

[56] References Cited

UNITED STATES PATENTS 3,260,654   7/1966   Toccaceli ....................195/66 R

OTHER PUBLICATIONS

Moriya et al., The Journal of Biochemistry, Vol. 58, No. 3, pp. 208–213 (1966)
Chemical Abstracts, Vol. 61; 15939h (1964).

Primary Examiner—Lionel M. Shapiro
Attorney—McCarthy, Depaoli & O'Brien

[57] ABSTRACT

The extraction of Kallekrein from the pancreas and submandibularis gland of pigs is carried out by subjecting the fresh comminuted glands at about room temperature with an aqueous solution of a salt, such as sodium chloride, of a concentration of from 3 to 25%, preferably 8% of the salt, at a pH value of 5.5 to 9.5, preferably 7.5 to 8.5, in the presence of a water-miscible solvent such as methanol, and the mixture stirred for about 1 hour. The aqueous kallekrein-containing phase is separated from the solids and the kallekrein precipitated in the presence of kieselguhr and acetone. High yields and great reduction in extraction time are noted.

4 Claims, No Drawings

PROCESS FOR OBTAINING KALLEKREIN FROM PANCREAS OR SUBMANDIBULARIS GLANDS OF PIGS

BACKGROUND OF THE INVENTION

1. Field of the Invention

The present invention is directed to a process for obtaining kallikrein, a well-known circulatory hormone, from animal glands and organs known to contain the kallekrein. More particularly, the invention relates to an improvement over the known extraction methods whereby the extraction time is drastically reduced and with greatly improved yields.

2. Description of the Prior Art

The pancreas gland and the submandibularis gland of pigs serve, in the first instance, as starting i.e. for obtaining kallekrein. In order to extract the active substance from the gland, either an autolysis is used, i.e. generally for 72 hours at 37°C in the presence of m/50 acetic acid, or an extraction with m/50 – m/10 acetic acid, or the aqueous gland suspension is subjected to heating to 38° to 65° C, preferably to 55° C, at a pH of 4 to 7, preferably 4.6, followed by the separation of the aqueous phase. [E.K. Frey, H. Kraut, E. Werle, Monography "Kallikrein, Padutin," Ferd.Enke, Publishers, 1950, pages 126 to 129; German Pat. specification, No. 129,026; German Pat. specification, No. 890,857].

Because of the high fat content of pigs' pancreas, i.e. up to 40%, it is frequently necessary to initially remove the fat from the glands by preparative methods or to precipitate by stirring the comminuted glands several times with acetone and to extract the kallekrein from the acetone-dried glands.

SUMMARY OF INVENTION

In contradistinction to these known processes, it has now been found that the kallekrein can be obtained from the raw, unprepared glands in a simple manner and with a high yield by extracting the fresh, comminuted glands at room temperature with aqueous, 3 to 25% salt solutions at a pH value of 5.5 to 9.5, preferably 7.5 to 8.5, and separating the kallekrein-containing phase in known manner.

Decisive for the success is not the type of the salt used, but the concentration of the electrolytes and the pH value during extraction.

The extraction time is short, 1 hour generally being sufficient.

Alkali metal and ammonium salts, such as NaCl KCl, $NaNO_2$, $NH_4Cl$, sodium phosphates etc. have proved to be especially suitable. When NaCl is used, maximum yields are achieved, i.e. 70,000 to 90,000 kallekrein units/kg pig pancreas at a concentration of 8%. The yields decrease when lower or higher concentrations are used: Thus, for example, not more than only 20,000 kallekrein units per kilogram were obtained with 4% or 25% common salt solutions.

In contrast to the know processes which are always carried out in an acidic medium, the optimum pH value of the process according to the invention ranges from 7.5 to 8.5; nevertheless, at a pH of 5.5 or 9.5, 20,000 kallekrein units per kilogram are still obtained. When the process is carried out without the afore-mentioned salt additions and an alkaline pH value is adjusted with lyes or organic bases only, then the yield remains below 10,000 kallekrein units per kilogram.

The extraction is carried out at room temperature, but it is also possible to operate at a somewhat higher or somewhat lower temperature. The extraction is completed at 20° C at a pH value of 8.0 in less than one hour in the presence of 8% common salt and 30% methanol.

An addition of water-miscible, organic solvents has proved to be expedient with regard to the degree of purity as well as the possibility of separating the kallekrein-containing aqueous solution. An addition of 30% methanol is the most favorable, but also ethanol, acetone etc. may be used. At higher concentrations of the organic solvent, part of the active substance is already precipitated leading to a loss in yield.

The kallekrein-containing aqueous phase can be separated from the solid gland components chiefly consisting of fat, connective tissues and insoluble protein, according to known methods, such as centrifuging, filtering or suction-filtration, expediently with the addition of kieselguhr and the like.

It has been found to be particularly advantageous to warm the suspension to 35° to 40° C, without stirring. Due to the high specific weight of the salt solution, on the one hand, and to the high fat content of the gland residues, on the other hand, the solid material rises to the top within a short period of time and this results in a clear separation of the aqueous phase which is discharged at the bottom. It is important that the limit of denaturing the protein, i.e. about 55° C, need not be reached for the separation.

When the separation is carried out by heating at 60° C for 1 hour, the yield decreases to a fraction.

Apart from the extraordinarily high yields, the special advantage of the process according to the invention lies in the fact that it is technically easily carried out on a large scale at low costs. Moreover, the destruction of the extremely heat-sensitive kallekrein is obviated due to the low temperatures used for extraction and separation.

Since the process according to the invention can be carried out within a very short period of time, an autolysis as well as a bacterial infection is prevented, especially in the presence of alcohol, so that the resultant aqueous kallekrein solution contains only a very small amount of pyrogenics, this having a substantial importance for the production of injection preparations.

The process can be carried out with the use of freshly slaughtered glands without any previous preparative separation of the fatty portions or without previously separating the fat by means of organic solvents and drying the glands.

The active substance can be precipitated with water-miscible solvents from the aqueous kallekrein solution obtained according to the process described above. The precipitation is quantitative, for example, at a concentration of 60% acetone. It is expedient to add to the aqueous solution, prior to precipitation, an inert substance with a large surface, e.g. kieselguhr, thus enabling the fine precipitate to be drawn on to the additive and then to be separated by filtration. This adsorbate is washed with acetone and then air-dried. It is stable and, due to its favorable properties, it can be either directly compressed to tablets or extracted with water, and the almost salt-free, clear solution can be further purified according to known methods and used for injection purposes.

EXAMPLE 5 kg of freshly slaughtered pig pancreas are thoroughly comminuted in a mincer and stirred into a solution of 14 liters distilled water, 6 liters methanol and 1.6 kg of common salt. A sufficient amount of 1N NaOH is added to the suspension to achieve a pH of 8.0.

This mixture is stirred at 20° C for 1 hour and the aqueous, kallekrein-containing phase is separated from the solid extraction residues.

This process may be carried out by centrifuging, filtering or suction-filtration. The separation takes place in a particularly easy way by warming the suspension at 35° to 40° C for about 1 hour without stirring. The fat-containing solid portions thus rise to the top and the almost clear aqueous extract can be discharged at the bottom. The yield amounts to 390,000 kallekrein units; one kallekrein unit is bound to 1.9 mg of organic substance of which 970., are biuret protein.

The kallekrein can be obtained almost quantitatively in solid form from the aqueous solution by precipitating it in the presence of kieselguhr with acetone, expediently at a final concentration of 60% acetone. The precipitate is filtered off with suction and air-dried. The resulting powder is stable and can directly be compressed to tablets.

The kallekrein can readily be extracted with water from the dry kieselguhr powder. The extract contains 350,000 kallekrein units; one kallekrein unit is bound to 250γ of organic substance (of which 50γ are biuret protein) and 65γ ashes.

What is claimed is:

1. A process for obtaining kallekrein from the pancreas or submandibularis glands of pigs, comprising extracting the fresh, comminuted glands at room temperature with a 3 to 25% aqueous salt solution at a pH value of from 5.5 to 9.5 and separating the resulting kallikrein-containing, aqueous phase from the solids by conventional methods.

2. A process as defined in claim 1 wherein the extraction is carried out in the presence of a water-miscible organic solvent.

3. A process as defined in claim 1 wherein the extraction is carried out at a pH from 7.5 to 8.5 and in the presence of methanol.

4. A process as defined in claim 3 wherein the aqueous salt solution is an 8% solution of common salt.

* * * * *